United States Patent
Barth et al.

(10) Patent No.: US 9,919,688 B2
(45) Date of Patent: Mar. 20, 2018

(54) METHOD AND SYSTEM FOR IDENTIFYING OPERATING STATES OF A VEHICLE, AND A VEHICLE WHICH COMPRISES SUCH A SYSTEM

(71) Applicant: WABCO GmbH, Hannover (DE)

(72) Inventors: Christoph Barth, Hannover (DE); Tobias Munko, Hannover (DE); Ingo Tha, Hannover (DE)

(73) Assignee: WABCO GmbH, Hannover (DE)

( * ) Notice: Subject to any disclaimer, the term of this patent is extended or adjusted under 35 U.S.C. 154(b) by 78 days.

(21) Appl. No.: 15/035,029

(22) PCT Filed: Oct. 22, 2014

(86) PCT No.: PCT/EP2014/002848
§ 371 (c)(1),
(2) Date: May 6, 2016

(87) PCT Pub. No.: WO2015/070945
PCT Pub. Date: May 21, 2015

(65) Prior Publication Data
US 2016/0257289 A1 Sep. 8, 2016

(30) Foreign Application Priority Data

Nov. 15, 2013 (DE) .......................... 10 2013 019 240

(51) Int. Cl.
*B60T 8/17* (2006.01)
*B60T 8/171* (2006.01)
*B60T 17/22* (2006.01)

(52) U.S. Cl.
CPC ............ *B60T 8/1708* (2013.01); *B60T 8/171* (2013.01); *B60T 17/22* (2013.01)

(58) Field of Classification Search
CPC ....... B60T 8/1708; B60T 8/171; B60T 11/108
See application file for complete search history.

(56) References Cited

U.S. PATENT DOCUMENTS 5,986,544 A 11/1999 Kaisers et al.
8,098,145 B2 1/2012 Ancuta et al.
(Continued)

FOREIGN PATENT DOCUMENTS

DE 3302236 A1 8/1983
DE 4039957 A1 6/1992
(Continued)

OTHER PUBLICATIONS

European Patent Office, Rijswijk, Netherlands, International Search Report of International Application No. PCT/EP2014/002848, dated Apr. 16, 2015, 2 pages.

*Primary Examiner* — Kimberly S Berona
*Assistant Examiner* — Anshul Sood
(74) *Attorney, Agent, or Firm* — Brinks Gilson & Lione

(57) ABSTRACT

A method for detecting an operating state of a vehicle, includes selecting the operating state from at least a first or a second operating state for a vehicle that includes a pneumatic brake system and a pneumatic control connection for connecting the pneumatic brake system to a further pneumatic brake system of a trailer. The method includes the following steps: applying pressure to the control connection until a starting pressure in the control connection is set; opening the control connection such that a pressure between the control connection and an environment is equalized; detecting a temporal pressure pattern during the pressure equalization; comparing the temporal pressure pattern to a reference pressure pattern; determining an evaluation result based on the comparison of the temporal and the reference pressure pattern; and assigning the evaluation result to the first or the second operating state of the vehicle.

16 Claims, 7 Drawing Sheets

(56) References Cited

U.S. PATENT DOCUMENTS

2010/0085172 A1 4/2010 Ancuta
2010/0262326 A1* 10/2010 Buszek .................. B60K 17/35
　　　　　　　　　　　　　　　　　　　701/31.4

FOREIGN PATENT DOCUMENTS

DE　　　　4200302 A1　7/1993
DE　　　19955798 A1　5/2001
GB　　　2 425 760 A　11/2006

* cited by examiner

METHOD AND SYSTEM FOR IDENTIFYING OPERATING STATES OF A VEHICLE, AND A VEHICLE WHICH COMPRISES SUCH A SYSTEM

TECHNICAL FIELD

The invention relates to a method for detecting operating states of a vehicle, in particular a state of the vehicle with or without a trailer, an electro-pneumatic system, and a vehicle.

BACKGROUND

The detection of an operating state of a vehicle, in particular whether a trailer is coupled, or not, to a (commercial) vehicle, e.g., to a truck, is typically carried out or queried in the prior art via a CAN connection between the vehicle and the trailer or via a corresponding CAN signal. Vehicles and trailers also exist, however, that do not have such a CAN connection. It is also possible that the CAN connection is defective or either only the vehicle or the trailer has a CAN connection such that a status query of the vehicle cannot be carried out via the CAN connection.

It would therefore be desirable, in addition to or instead of the status query via a CAN connection, to provide a method and a device, which provide for the detection of the operating state of a vehicle, specifically the state of the vehicle in which a trailer (trailer mode) is attached, or in which a trailer is not attached (solo mode). A plurality of methods for this purpose are known from the prior art.

For example, a method for checking a vehicle/system by way of a control unit is described in the document DE 42 00 302 C2. The control unit comprises a pressure line, which is connected via a coupling point to a pressure line of a further system, e.g., of a trailer. A state of the system is determined by evaluation of the pressure in the pressure line.

In addition, it is known from the document DE 197 44 066 B4 to use a method for the detection of a trailer with respect to a vehicle, in which the control pressure going to the trailer is detected in such a way that a pressure build-up-characterizing variable is determined from a pressure signal and is evaluated.

Document DE 199 55 798 A1 describes a trailer detection for a combination of towing vehicle having a hydraulic brake system and a trailer having a pneumatic brake system, wherein the trailer is attached to the towing vehicle. For the detection as to whether a trailer is actually attached to the towing vehicle, the temporal behavior of the pressure in a pneumatic space, which is closed with respect to the atmosphere, is determined.

The patent application DE 33 02 236 A1 also describes a test device for a pressure change in a compressed-air system, in particular in a multi-circuit brake system. In addition, a method for testing a brake system of a vehicle in the static mode is known from document DE 40 39 957 A1.

The methods and devices known from the prior art have the disadvantage that they can be used only under certain conditions or prerequisites, specifically only when, e.g., a special brake system or a particular valve is available for use.

In this regard, the problem addressed by the invention is that of providing an improved method and an improved device for detecting an operating state of a vehicle, in particular a state of a vehicle with or without a trailer attached, without the use of a CAN signal. In particular, the problem addressed by the invention is that of providing a method, which can be used independently of a system or independently of a vehicle.

SUMMARY OF THE INVENTION

The invention comprises a method for detecting an operating state of a vehicle, wherein the operating state is selected from at least a first or a second operating state, in particular from the state of the vehicle with or without a trailer, and the vehicle comprising a pneumatic brake system and a pneumatic control connection, which is designed for connecting the pneumatic brake system to a further pneumatic brake system of a trailer, characterized in that the method includes the following steps:

applying pressure to the control connection until a starting pressure in the control connection is set;
opening the control connection such that a pressure between the control connection and an environment is equalized;
detecting a temporal pressure pattern during the pressure equalization;
comparing the temporal pressure pattern to a reference pressure pattern;
determining an evaluation result based on the comparison of the temporal pressure pattern and the reference pressure pattern; and
assigning the evaluation result to the first or the second operating state of the vehicle.

The invention further comprises an electro-pneumatic system for detecting an operating state of a vehicle, in particular being designed for carrying out the method according to the invention, comprising:

a pneumatic braking-pressure system,
a control connection, which is designed for connecting the pneumatic braking-pressure system to a further pneumatic braking-pressure system of a trailer,
a pressure accumulator for applying pressure to the control connection,
a vent valve for opening the control connection to the environment,
a pressure sensor for detecting a temporal pressure pattern in the control connection,
wherein the system
comprises a control unit, which is designed for determining an evaluation result from the temporal pressure pattern and a reference pressure pattern and assigning the evaluation result to an operating state of the vehicle, wherein the operating state is selected from at least a first and a second operating state, in particular from a state of the vehicle with or without a trailer.

Moreover, the invention comprises a vehicle containing an electro-pneumatic system according to the invention for detecting an operating state of a vehicle, which is designed, in particular, for carrying out the method according to the invention.

The concept of the invention is described in the following by way of example, without being limiting.

The proposed method and the electro-pneumatic system, by detecting a temporal pressure pattern during the ventilation and venting of a control connection of a vehicle, make it possible to infer the vehicle operating state, in particular to detect and output the operating state. The method according to the invention is provided for all vehicle types comprising a pneumatic brake system, in particular for commercial vehicles such as trucks and tractor-trailers. The acquisition of the temporal pressure pattern after applying pressure to and opening the control connection is a suitable criterion for the determination of the vehicle operating state, in particular of the operating state of the vehicle with or without a trailer. The control connection is, for example, a pneumatic control line of a pneumatic system of the vehicle, which is attachable to a further pneumatic system, for example, of a trailer. The detected temporal pressure pattern or the pressure behavior describes the change in the pressure in the control connection with respect to time. According to the invention, first the pressure in the control connection is manipulated in such a way that a pressure (starting pressure) in the control connection differs from that in the environment. After the control connection is opened to the environment, a pressure between the environment and the opened control connection is equalized after a certain time, wherein the temporal change in the pressure, specifically the temporal pressure pattern in the control line, is detected. An evaluation result is determined from a comparison of the detected temporal pressure pattern with a temporal reference pressure pattern, wherein the evaluation result is a measure, in particular, of a deviation of the detected pressure pattern from the reference pressure pattern. After the determination of the evaluation result, said result is subsequently assigned to an operating state of the vehicle.

By way of comparison of the detected temporal pressure pattern with the reference pressure pattern, a decision is made regarding which vehicle operating state is present, in particular whether a trailer mode or a solo mode of the vehicle is present. For this purpose, it is particularly necessary to specify a suitable reference pressure pattern. According to the concept of the invention, the reference pressure pattern in this case can represent either the operating state of the vehicle with a trailer or the operating state without a trailer, i.e., the trailer mode or the solo mode of the vehicle.

Within the scope of a preferred embodiment, a temporal pressure pattern is saved and is stored in the system as a reference pressure pattern for a previously determined vehicle operating state (i.e., under controlled conditions), specifically with or without a trailer. The thus detected pressure pattern, which then represents this determined vehicle operating state, is used in the comparison with other pressure patterns—detected during the method—as the reference pressure pattern and makes it possible to infer the vehicle operating state.

Within the scope of another possible, preferred embodiment of the invention, it is provided that a theoretical model is used as the reference pressure pattern. The model is preferably intended to depict the reference curve for the solo mode of the vehicle. If a deviation from the reference curve is determined via the comparison, a trailer mode is inferred. In advance of the present invention, the applicant carried out different pressure-time measurements with respect to a vehicle having a specified volume in order to determine a theoretical model for a suitable reference pressure pattern. Without limiting the invention, a volume for a vehicle in the solo mode of approximately V=0.45 l was assumed (e.g., for a truck model Actros 2553, 6×2), by way of example, or a volume of approximately V=0.4 l for a tractor-trailer as the sum of V=0.2 l for the solo vehicle and V=0.2 l for the helical flexible line. It has been shown that the pressure pattern for the solo mode, at this volume (see above), can be substantially described by the following formula/function:

$$t_{Ref}(p) = 22 \frac{\text{ms}}{\text{bar}} \cdot p + 90 \text{ ms} \quad (1.1)$$

The comparison of the simulation and the measurement shows good conformance. The (constant) volume used in this measurement is used as the standard volume. The slope of this (linear) function is constant, of course, given a constant volume. Other slopes result for other volumes, however, since this depends on changes in the volume. The volume is always constant, however, for a single vehicle/vehicle type. Changes occur only with different vehicles or vehicle types. If the volume deviates from the aforementioned standard volume, the slope can be corrected or adjusted according to the following formula:

$$m_{Kor}(V_{Abw}) = 52.7 \frac{\text{ms}}{\text{bar} \cdot l} \cdot V_{Abw} + 22 \frac{\text{ms}}{\text{bar}}. \quad (1.2)$$

Changes in the volume do not occur during the running operation of a vehicle.

Provided a suitable reference pressure pattern has been determined or specified, be it for the operating status with or without a trailer, a comparison with the detected pressure pattern can now be carried out. If the comparison shows that detected temporal pressure pattern and the reference pressure pattern are substantially in agreement, i.e., they are identical except for a few differences, the vehicle operating state represented by the reference pressure pattern is present. If there is no agreement, however, i.e., the detected pressure pattern and the reference pressure pattern clearly differ, a vehicle operating state other than that of the reference pressure pattern is present.

In another possible embodiment of the invention, after the determination of the vehicle operating state, the determined operating state is output to the vehicle driver, for example, via a display device, e.g., a lamp or a screen, and so the driver is informed of the vehicle operating state.

This and other preferred embodiments of the invention more precisely describe further improvements of both the method and the electro-pneumatic system and the vehicle. In particular, preferred refinements describe advantageous possibilities for realizing or designing the aforementioned method/device within the scope of the statement of the problem and with respect to further advantages.

In particular, it is provided that the opening of the control device is carried out by via a vent valve. This is a vent valve that controllably opens the control connection to the environment. For example, an automatically controllable ventilation and vent valve in the form of a magnetic or electromagnetic valve is provided here.

In an advantageous embodiment, it can be provided that the temporal pressure pattern is a pressure drop in the control line. In this embodiment, a pressure or pressure level in the control line is higher than in the environment. After the control line is opened to the environment, the pressure in the control line drops from the starting pressure until a pressure between the environment and the control line has equalized.

According to a preferred refinement, the following steps are carried out in addition, during the detection of the temporal pressure pattern, specifically: starting a time-measuring instrument when the control connection is opened; stopping the time-measuring instrument when a pressure limit value has been reached in the control connection; and determining a vent time of the control connection. In this case, it is advantageously provided that a time period is determined by a time-measuring instrument or timer simultaneously with the acquisition of the pressure pattern in the control connection. The measurement of the time period begins when the control connection is opened to the environment and ends when a pressure limit value in the control connection has been reached. In this case, it can be provided, in particular, that an internal or external clock is used as the time-measuring instrument, for example, a quartz-crystal clock. In another embodiment, a software-based time-measuring instrument is used. The time measurement can be either absolute or relative. It is provided that the time-measuring instrument is ended when a pressure limit value in the control device is reached. This can be an atmospheric pressure, for example. Without limitation, other pressure limit values that deviate from the atmospheric pressure can also be provided, such as, e.g., a pressure limit value of 0.1 bar, wherein the pressure limit value is preferably higher than the atmospheric pressure.

In one advantageous embodiment, it can be provided that the vent time of the control connection is assigned to the temporal pressure pattern and a reference vent time is assigned to the reference pressure pattern. According to this embodiment, vent times are assigned to the particular pressure patterns such that it is subsequently possible to compare not only the individual pressure patterns but also, in addition or instead, the respectively assigned vent times. The vent time is the time during which the pressure drops from the starting pressure to the ambient pressure when the control connection is opened to the environment. The reference vent time, in turn, represents a previously established/determined operating state of the vehicle, e.g., the vent time of the control line of a vehicle with or without a trailer. After the temporal pressure pattern is assigned to the vent time, the vent time is then compared to the reference vent times, and so the vehicle operating state can be detected on the basis of this comparison.

According to a preferred refinement, a difference is formed in the comparison of the vent time and the reference vent time. In this case, it is particularly provided that the first operating state represents the operating state of the vehicle with a trailer, and the second operating state represents the operating state of the vehicle without a trailer. Moreover, the reference vent time represents one of the two operating states of the vehicle, specifically with or without a trailer. In forming a difference of vent time and reference vent time, given a difference value of $\Delta t > +200$ ms, the operating state other than that represented by the reference vent time is assigned to the vehicle. Given a difference value of $\Delta t < |\pm 50|$ ms, the same operating state, specifically the operating state of the reference vent time, is assigned.

According to one refinement, it can be provided that the method, after the detection of the temporal pressure pattern, includes the following steps, in addition, specifically determining a time derivative of the temporal pressure pattern; and comparing the time derivative to a time derivative of the reference pressure pattern. In this embodiment, the time derivative of the temporal pressure pattern is compared to the time derivative of the reference pressure pattern. In this case, an additional check/an additional detection of the vehicle operating state is possible. A comparison of the change with respect to time (derivative) of the temporal pressure pattern can be carried out as a supplement, i.e., in addition to or instead of the comparison of the pressure patterns or vent times. In some cases, it is advantageous to compare the time derivatives, since these react more sensitively, in some cases, to differences or deviations from the reference pressure pattern. The supplemental comparison of the change (derivative) of the temporal pressure pattern can also be utilized for checking or verifying the comparison of the temporal pressure pattern.

According to another embodiment, it is preferably provided that the starting pressure in the control connection preferably has a value of 6 to 5 bar. Moreover, it can also be advantageous to provide lower pressures, e.g., 3 to 4 bar or less than 3 bar, in particular 1.5 bar to 1 bar, as the starting pressure to be applied to the control connection. Lower starting pressures occur, in particular, when there is insufficient pre-pressure available or when a braking procedure of the vehicle is initiated by a driver during the driving operation.

According to a particularly advantageous embodiment, the method is carried out before the commencement of driving and/or after a braking procedure of the vehicle. This embodiment makes the starting time for the method more precise. The time for carrying out the method must be selected in a suitable manner. As a result of the level of the starting-pressure value in the control line, the method is preferably carried out with the vehicle at a standstill, or said method can only be carried out when the vehicle is at a standstill if the pressure value is high, for example, 6 bar, and so only two time points are possible in the latter case, specifically, in one case, after the release of the hand brake valve and, in another case, after a braking procedure of the vehicle carried out by the driver that results in the vehicle coming to a standstill (e.g., at a traffic light). A time of approximately $t=400$ ms is required for the application of pressure to the control connection (pressure build-up phase). Shorter pressure-application times are also possible, however. In addition, a time of $t=800$ ms is required to open the control line and detect the pressure pattern, and so, overall, a time of $t=1200$ ms should be available for the method according to the invention. The time period during which the vehicle is stopped at a traffic light is therefore sufficient, in most cases, for carrying out the method according to the invention.

According to another preferred embodiment, the parking-brake valve of the vehicle is released before pressure is applied to the control connection. In this case, an initial check is carried out to determine whether the vehicle is at a standstill and whether the parking brake has been released or the parking-brake valve of the vehicle has been opened.

A preferred embodiment relates to a method in which the control connection is only partially emptied before pressure is applied to the control connection. In this case, it is preferably provided that the control connection is not completely emptied, since the pressure to be applied would then be lower than if the control connection were completely emptied. It is provided that pressure is applied to the control connection in near time or quickly, in particular, after the release of the parking brake of the vehicle, wherein the immobilizing pressure is not vented completely to the environment, but rather is partly used for the setpoint pressure. The release of the parking brake is detected via a (pressure) monitoring of the control line, in particular in the case when an electronic parking brake or a switching signal is not present.

According to an advantageous embodiment, the control connection is not opened until a stable pressure level in the control connection has been reached. In this case, it is provided, in particular, that the release of the parking brake or an opening of the parking-brake valve of the vehicle is detected in near time, i.e., in a range of 50 to 100 ms. Immediately after the detection, the application of pressure to the control connection is initiated, even before the pressure in the control connection drops to zero or atmospheric pressure. If pressure is immediately applied to the control connection without the control connection having been completely emptied, however, this can result in an unstable phase in the control connection, i.e., pressure fluctuations of the pressure level of up to ±0.5 bar in the control connection. Therefore, it is advantageous to not open the control connection to the environment until a stable phase/a stable pressure level, i.e., fluctuations in the pressure level of less than ±0.2 bar, has been reached.

According to another embodiment, the evaluation result is assigned to a third operating state of the vehicle if the operating state cannot be assigned to either the first or the second operating state of the vehicle. The third operating state is a so-called unknown state, which cannot be clearly assigned to either the first state of the vehicle, for example, the state of the vehicle with a trailer, or to the second state of the vehicle, for example, the state of the vehicle without a trailer. In one possible embodiment of the invention, in particular in a formation of a difference of the vent time and the reference vent time, the third unknown state corresponds to a difference value range of the vent time minus the reference vent time of $\Delta t = |\pm 50|$ to $|\pm 200|$ ms.

According to another embodiment, after the assignment of the third operation state, the method is repeated until the evaluation result is assigned to the first or the second operating state. In this case, the method is repeated until an operating state of the vehicle can be assigned to the first or the second operating state, in particular a state of the vehicle with or without a trailer, or a correction/adjustment of the reference vent time is necessary.

Exemplary embodiments of the invention are described in the following with reference to the drawings in comparison with the prior art, which is also depicted in part. This is not intended to necessarily depict the exemplary embodiments in full scale, rather the drawings are depicted in a schematicized and/or slightly distorted form in cases where this is useful for the purpose of explanation. Reference is made to the relevant prior art with respect to additions to the teachings that are directly evident from the drawings. It should be noted that diverse modifications and changes can be made with respect to the form and the detail of an embodiment without deviating from the general idea of the invention. The features of the invention disclosed in the description and in the drawings can be essential to the refinement of the invention both individually as well as in any combination. In addition, all combinations of at least two features disclosed in the description or the drawings fall within the scope of the invention. The general idea of the invention is not limited to the exact form or the detail of the preferred embodiment shown and described in the following. In the measurement ranges indicated, values located within the mentioned limits are also intended to be disclosed as limit values. Identical or similar parts, or parts having an identical or similar function are provided with an identical reference number, for the sake of simplicity, where this makes sense.

Further advantages, features, and details of the invention will become apparent from the following description of the preferred exemplary embodiments and with reference to the drawings.

DETAILED DESCRIPTION OF THE DRAWINGS

Figure 1:
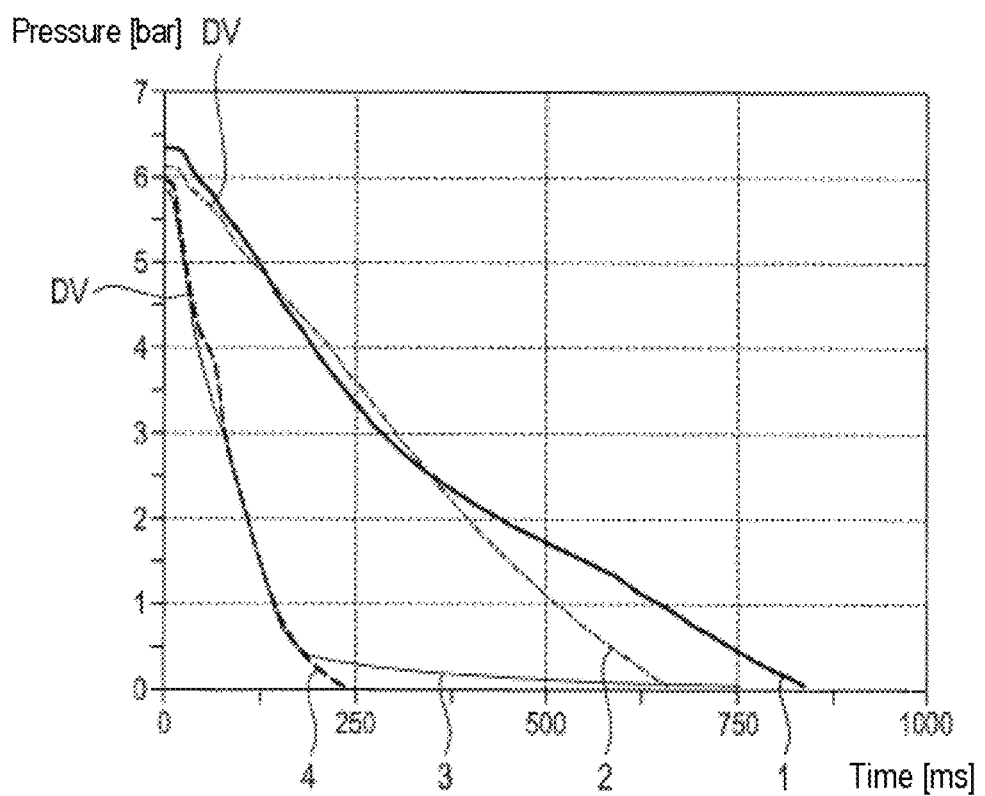
FIG. 1 shows a measurement of multiple temporal pressure patterns after the release of a hand brake valve and after a sudden pressure setpoint change.

FIG. 1 shows a pressure-time diagram, wherein multiple temporal pressure patterns DV of a vehicle are depicted in the diagram. The pressure values on the pressure axis are indicated in the SI unit [bar] and the time values on the time axis are indicated in [ms].

Shown in the diagram is a total of four different time-pressure patterns 1, 2, 3, 4 during venting of a trailer control connection, in particular a pneumatic control line, of a vehicle, specifically, in one case, the time-pressure pattern DV after a release of a hand brake valve of a vehicle and, in another case, after a defined application of pressure to the control connection and a subsequent venting of the control connection to the environment or atmosphere. A trailer control connection is designed, in particular, as a pneumatic control line and as part of the pneumatic system of the vehicle and, moreover, is configured to be coupled to a pneumatic system of a trailer via a trailer control valve.

A total of four temporal pressure patterns DV are depicted in FIG. 1, specifically, in one case, after the venting of the control line after the opening of a hand brake valve, in particular, in one case, for the operating state of the vehicle having an attached trailer 1 and, in another case, for the operating state without the trailer 2 and, in another case, after a sudden setpoint change, again with the same vehicle, in one case with a trailer 3 and in another case without a trailer 4. In the present application, a sudden setpoint change is understood to be a sudden pressure setpoint change, wherein this is a defined application of a setpoint pressure value to the control line, followed by a venting of the control line to the environment. In the present case, an inlet pressure of substantially 6 bar is applied to the control line, by way of example, wherein "substantially" means that slight deviations of the inlet pressure of ±0.1 bar can be disregarded. After the control connection has been opened to the environment or the atmosphere, the tendency is for a pressure in the control connection to equalize, and so the pressure in the control connection drops to an outlet pressure of substantially 0 bar.

The pressure patterns 1, 2, 3, 4 shown in FIG. 1 therefore show a pressure behavior in the control connection or control line of a vehicle after the control connection has been opened to the atmosphere or the environment. On the basis of the pressure patterns, a vent time for the control connection of the vehicle can be determined for each of the different operating states, wherein the vent time is the time period between the opening of the control connection to the environment, and the attainment of a (limit) pressure in the control connection. In other words, in one embodiment of the invention, the individual vehicle states or operating states, specifically a vehicle with a trailer or without a trailer, can be respectively assigned to the different pressure patterns on the basis of the different vent times.

The vent times of the control connection after the release of a hand brake valve are in a range of over T=550 ms (cf. pressure patterns 1, 2 in FIG. 1). The differences in the vent times for the two pressure patterns 1 and 2 (after the release of the hand brake valve in each case), which represent the two operating states of the vehicle, specifically with and without a trailer, are approximately 175 ms in the case of the present (single) measurement. By carrying out a large number of measurements of vent times after the release of the hand brake valve, it has been shown that the vent times are between 550 ms and 650 ms on average, wherein a large scattering with vent times of up to 900 ms was present. It was determined that an assignment of vent times to the operating states of the vehicle with or without a trailer (trailer mode or solo mode), after the release of the parking brake or the opening of the hand brake valve, is not possible, since the differences in the vent times are too small.

The situation in which a temporal pressure pattern DV is measured after a sudden setpoint change is different. The slope for the different operating states of the vehicle, specifically with and without a trailer, changes substantially, in particular, in a pressure range of approximately 0.5 bar (cf. 1 and 2 in FIG. 1). The change in the slope is dependent on the volume of the control line to be vented, which volume is greater when a trailer is attached than in the solo mode. This results in the difference in the measured vent times of approximately 750 ms with a trailer attached as compared to approximately 250 ms without a trailer attached. It has been shown, in particular, that the measurement of the vent time of the control line is a good criterion for determining whether or not a trailer is attached. It is possible to use, as the distinguishing criterion, not only the vent time, but also the change with respect to time or the derivative of the temporal pressure pattern, preferably in the range of 0.5 bar.

The difference in the vent times between the two situations, specifically, in one case, after the release of the hand brake valve and, in another case, after a sudden setpoint change, is due to the mode of operation of the trailer control valve. That is, if the hand brake valve of a vehicle is moved from a park position into a drive position, pressure is built up in the trailer control valve simultaneously with the venting of the control connection in order to switch the trailer control valve to drive readiness. In contrast, after a sudden setpoint change or after braking by the driver, the control connection is vented without a "readjustment" or a "transient state".

The temporal pressure pattern DV, the vent time and/or the changes in the temporal pressure pattern DV in the control line after a sudden setpoint change proves, overall, to be a suitable criterion for determining the operating state of a vehicle. In the case of high sudden setpoint changes, in particular, a distinction between the individual operating states of the vehicle, in particular with or without a trailer, is clearly evident.

Figure 2:
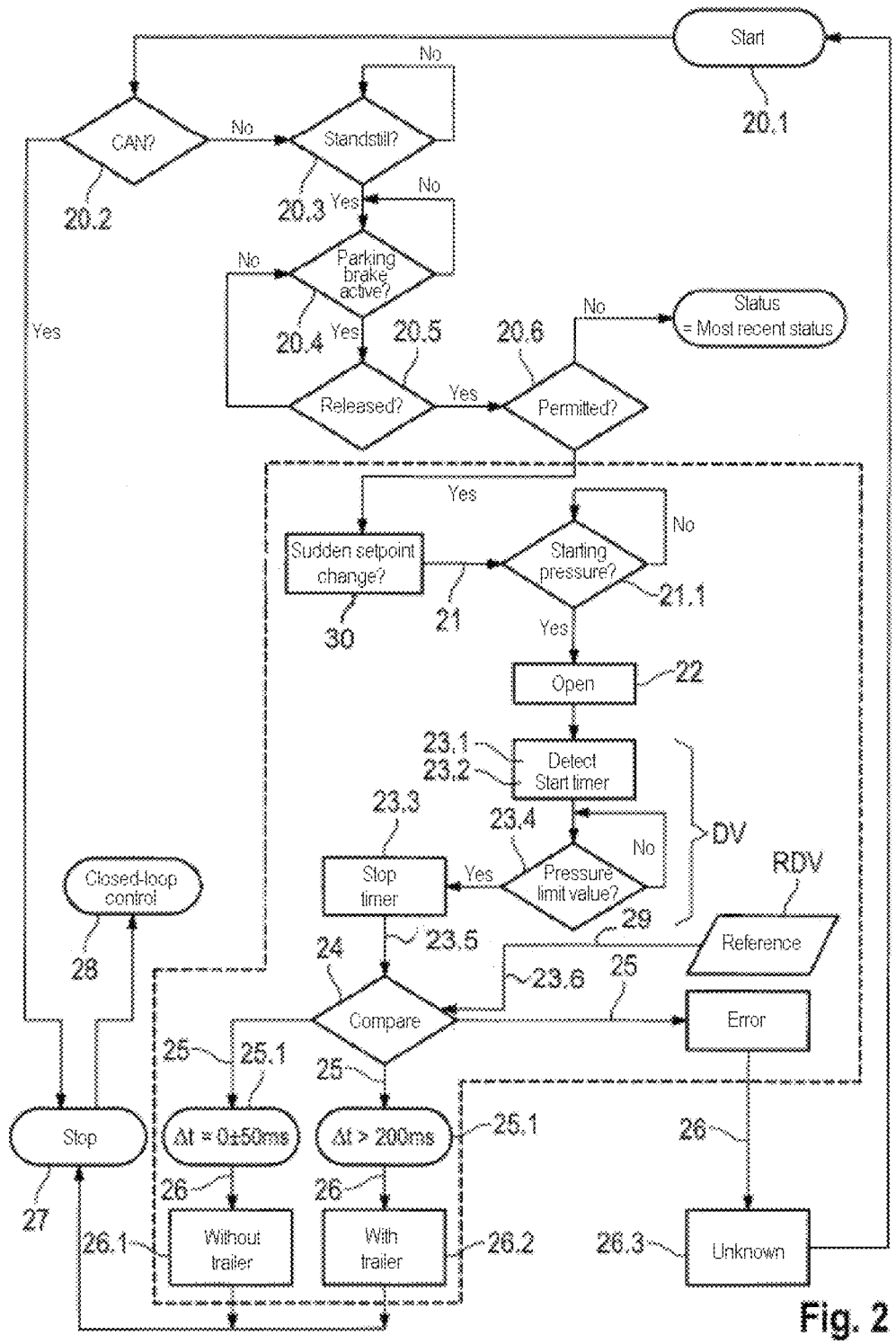
FIG. 2 shows a schematic flow diagram according to one possible embodiment of the method.
Figure 3:
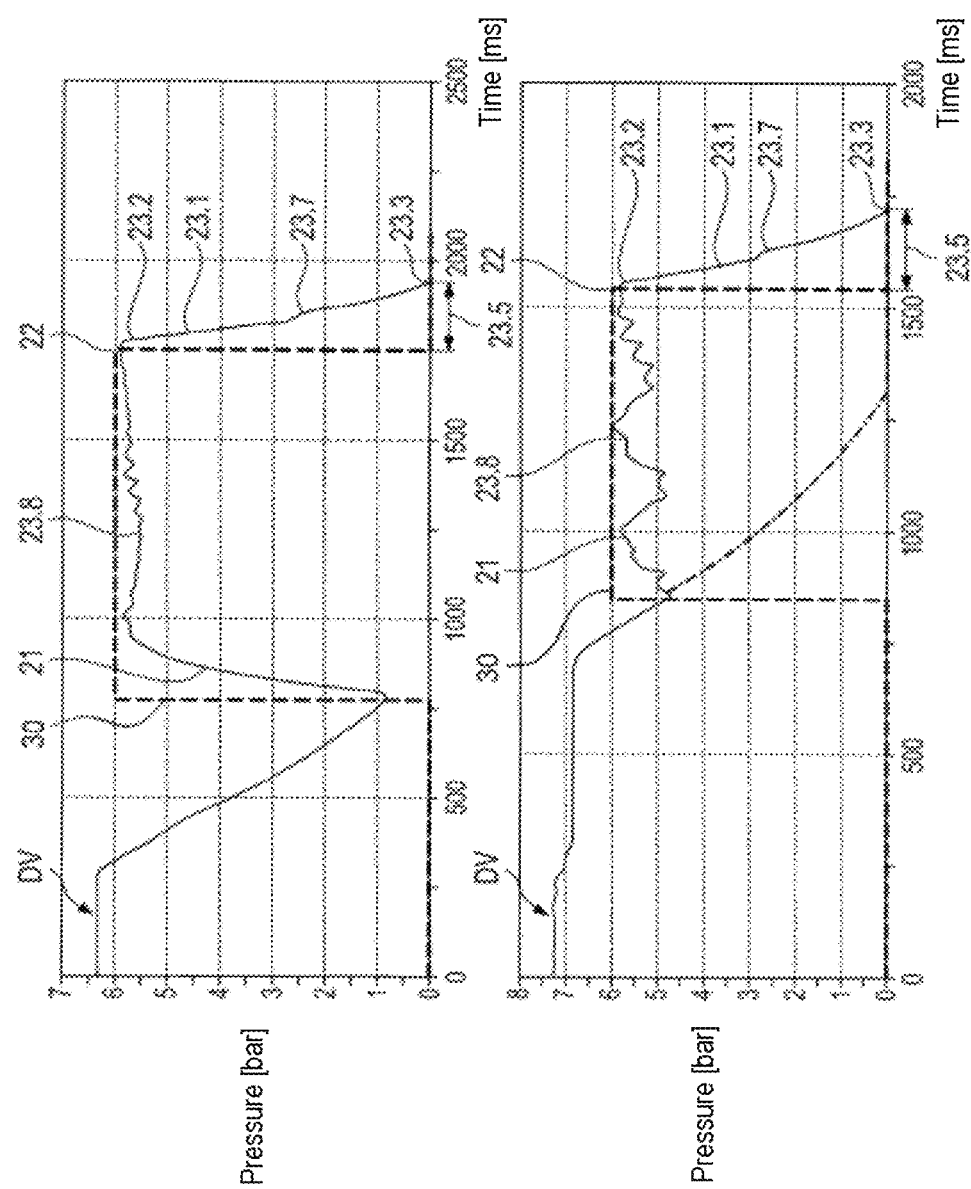
FIG. 3 shows two pressure-time diagrams, each having a detected temporal pressure pattern.

FIG. 2 shows a schematic flow diagram according to one possible embodiment of the method having a sudden setpoint or pressure setpoint change 30, which is carried out (temporally) after a parking-brake valve of a vehicle has been opened. Depicted in particular is the logic—on which the method is based—for the detection and evaluation of the temporal pressure patterns DV for detecting an operating state of the vehicle, in particular whether or not a trailer is attached to the vehicle via a control line. Depicted in FIG. 3 is the pressure pattern (DV) corresponding to the method depicted in FIG. 2. The core of the method is outlined with the dashed line (cf. FIG. 2).

First, the method for detecting an operating state of a vehicle, which is also referred to in the present application as a detection method, is started 20.1 by a call, for example, by a brake management system. Before a sudden setpoint change 30 is carried out, however, a series of preliminary checks 20.2 to 20.6 is carried out, wherein it is first checked to determine whether the operating state can be detected via a CAN signal 20.2 or via another available internal variable. If a (trailer) detection is possible via a CAN signal 20.2, the detection method is subsequently ended 27 and is switched back 28 to the closed-loop control of the vehicle.

For the case in which a detection is not possible via a CAN signal 20.2, a detection of the operating state of the vehicle is carried out according to the detection method, in particular via a detection and evaluation of temporal pressure patterns DV after a sudden pressure setpoint change. First, however, a check is carried out to determine whether the further prerequisites for carrying out the detection method are present, in particular whether the vehicle is at a standstill 20.3, whether the parking brake is active 20.4, and whether the parking brake is released 20.5, in particular whether the parking-brake valve has been opened. If all the prerequisites for carrying out the detection method have been met, the method can continue.

A suitable time point must be selected for carrying out the detection method. Due to the level of the sudden setpoint change, of 6 bar, for example, it is preferable that the detection method be carried out at a standstill. Overall, a time of approximately t=1200 ms is required for the detection method. Shorter times can also be implemented, of course. On the basis thereof, two possible time points come under consideration, specifically, in one case, after the release of the hand brake valve and, in another case, after a braking procedure of the vehicle by the driver, which brings the vehicle to a standstill (e.g., at a traffic light). The first possibility, i.e., the time point after the release of the locking valve, is depicted in FIG. 2. The other possibility, i.e., the time point after a braking of the vehicle by the driver, is depicted and described in FIG. 4 (cf. description of FIG. 4, below).

In the case of a vehicle having an attached trailer, the (maximum) vent time after a sudden setpoint change is up to 800 ms (cf. FIG. 1, above). Combined with the necessary pressure build-up phase (t=400 ms), a total of approximately t=1200 ms is therefore required for carrying out the detection method, during which time the vehicle is (ideally) at a standstill. The venting procedure initiated by the release of the hand brake valve with a trailer attached lasts for approximately 800 ms. It is therefore advantageous to use this time period, since the driver must wait anyway for the "release of the vehicle" or the ventilation of the spring-type accumulator. If the release of the hand brake is detected in near time, for example, the method according to the invention can be started as quickly as possible. In the ideal case, the waiting time for the driver until he drives away is extended only slightly, i.e., in a range of approximately 500 ms. In addition, a portion of the pressure pattern (in the case of a vehicle with a trailer) extends in a pressure range below 0.5 bar, and so, depending on the type of trailer, the brakes/brake shoes of the trailer are no longer engaged at all and the vehicle can be moved already. As a rule, when the hand brake valve is released, the driver actuates the braking power detector in order to prevent the vehicle from rolling away. In order to not falsify the pressure pattern in the control line, the setpoint for the detection method generated by the driver must be cleared. The same then also applies, however, for a detection after braking at a traffic light. This is problematic for the case in which a fixation of the vehicle is carried out without the driver's knowledge and the driver lifts his foot off of the braking power detector in order to drive away. In this case, it is then possible that the brakes of the trailer are still engaged, and so it is not (yet) possible to drive away. In one embodiment, after the driver's foot is released from the braking power detector, the detection method is therefore immediately aborted.

The detection of the opening of the hand brake valve can be carried out either indirectly by the monitoring of the pressure pattern DV in the control line or directly via a CAN connection/a CAN signal—provided this is available in the vehicle—from the hand brake valve. As described above, the release of the hand brake valve results in a venting of the control line. If the control line is entirely or partially emptied after the release, a sudden pressure setpoint change can be carried out.

If the necessary prerequisites for a sudden pressure setpoint change 30 are (still) not met, the necessary test loops are carried out by the detection method until all prerequisites have been met in order to carry out a sudden pressure setpoint change (cf. reference numbers 20.3 to 20.5 in FIG. 2).

Before the sudden pressure setpoint change is carried out, another check is first carried out to determine whether it is even actually permissible 20.6 to carry this out. A sudden pressure setpoint change 30 can be prohibited, for example, if the vehicle is parked in a parking position on a slope or is located in the workshop.

If a sudden pressure setpoint change 30 is permissible, pressure is applied to the control line until a constant pressure level, in particular of substantially 6 bar, has set in (cf. reference number 21 in FIG. 2 and FIG. 3). During the pressure application 21, a check is continuously carried out by a check routine to determine whether the starting pressure 21.1, in this case, of 6 bar in the control line, has been reached. As soon as the starting pressure (e.g., 6 bar) has been reached, the control line can be subsequently opened 22 to the atmosphere or the environment via a vent valve such that a pressure equalization, in particular a pressure drop, occurs in the control line, or the control line is vented.

The time point for carrying out the sudden pressure setpoint change 30 depends substantially on the detection of the release of the hand brake valve. In FIG. 3, the case of a late detection (t>500 ms) is depicted in the upper area and the case of a rapid detection (t<300 ms) is depicted in the lower area. In the upper case, the pressure in the control line has already dropped extremely and the control line must be (completely) ventilated again, in particular, pressure must be applied to said control line. In the lower case, the release of the hand brake valve is detected immediately at the beginning of the pressure drop, and so—after a short reaction time—the control line can be ventilated again, which is advantageous, since the level of the necessary pressure build-up is lower and, therefore, the total time for the detection method is reduced. In the latter case, however, an adjustment of a stable pressure phase in the control line, i.e., a small fluctuation of the pressure by 6 bar, is more difficult, since the ventilation of other connections takes place simultaneously.

In the detection method depicted in FIG. 2, simultaneously with the opening 22 of the vent valve for venting the control line, a timer/time-measuring instrument is started 23.1 for the calculation/recording of the vent time of the control line. As soon as the pressure in the control line has reached a lower pressure limit value 23.4, e.g., atmospheric pressure, the timer/time-measuring instrument stops 23.3.

During the time recording, i.e., during the venting of the control line, in particular during the pressure equalization, the pressure/the temporal pressure pattern DV, in particular the pressure behavior in the control line, is detected 23.2 by a pressure sensor. After conclusion of the sudden pressure setpoint change, the vehicle can be moved.

For the purpose of evaluating the detected pressure pattern DV or the detected vent time (cf. reference number 23.5 in FIG. 3), the pressure pattern DV or the vent time is compared 24 with a reference pressure pattern RDV and/or a reference vent time 23.6, for example, by forming the difference between the detected vent time 23.5 and the reference vent time 23.6. For the sake of completeness, it should be mentioned again here that a corresponding vent time 23.5, 23.6 may be easily determined from the pressure pattern DV or from the reference pressure pattern RDV, specifically from the difference of the time point for the opening 22 of the control line and the time point for the attainment of the pressure limit value 23.4.

The reference vent time 23.6 used is, for example, the vent time of the control line in the operating state of the vehicle without a trailer attached, which is present as a (theoretical) model and/or as a vent time detected under controlled conditions. Without limitation, it is also possible to use the vent time of the control line in the operating state of the vehicle with the trailer attached.

If the difference value of the detected vent time 23.5 and the reference vent time 23.6, wherein the reference vent time represents a vent time without a trailer, is greater than $\Delta t=+200$ ms, a decision is made by the detection method in favor of an operating state of the vehicle with a trailer 26.1. However, if the difference is 0 or is in a range of $\Delta t=+/-50$ ms, a decision is made in favor of a solo mode of the vehicle, i.e., without a trailer 26.2.

If the ascertained difference value of the detected vent time 23.5 and the reference vent time 23.6 is therebetween, i.e., in the range between the solo mode and the trailer mode, i.e., in a range $\Delta t=+50$ ms to $+200$ ms, or, however, is less than $\Delta t=-50$ ms, an error or an error message is output. In this case, an error regulation or error routine is carried out in such a way that the status of the operating state of the vehicle is set to an unknown status 26.3 and the brake management system repeats the detection method once more in order to carry out a new detection of the operating state. In this case, for example, an internal first error counter (not shown) is incremented by +1. If a maximum value of 5, for example, is reached with the first error counter after one repetition, it can be provided that the method carries out a correction or an adjustment of the reference vent time (cf. also FIG. 6, below, in this regard).

FIG. 3 shows a pressure-time diagram having a pressure-time curve for a temporal pressure pattern DV or a pressure behavior in the control line, during which the detection method—depicted in FIG. 2—or the particular steps are carried out, in particular during a sudden pressure setpoint change 30. The values on the pressure axis are indicated in the SI unit [bar] and the values on the time axis are indicated in [ms].

The time point for carrying out the sudden pressure setpoint change 30 depends substantially on the detection of the release of the hand brake valve. In FIG. 3, the case of a late detection (t>500 ms) is depicted in the upper area and the case of a rapid detection (t<200 ms) is depicted in the lower area. In the upper case, the pressure in the control line has already dropped extremely and the control line must be (completely) ventilated again, in particular, pressure must be applied to said control line. In the lower case, the release of the hand brake valve is detected immediately at the beginning of the pressure drop, and so—after a short reaction time—the control line can be ventilated again, which is advantageous, since the level of the necessary pressure build-up is lower and, therefore, the total time for the detection method is reduced. In the latter case, however, an adjustment of a stable pressure phase in the control line, i.e., a small fluctuations of the pressure by 6 bar, is more difficult, since the ventilation of other connections takes place simultaneously.

The first pressure drop in the pressure-time pattern DV, shown in FIG. 3, in particular in the upper diagram, represents the release of the parking-brake valve, wherein the control connection/control line is vented. If the control line is partially or completed vented (cf. upper or lower part of the diagram), pressure up to a certain starting pressure is subsequently applied to the control line again, in particular until a stable pressure level of approximately 6 bar has become established in the control line. Subsequently, the control line is opened 22 with respect to the environment (atmosphere) via a vent valve and, simultaneously, a timer is started 23.1. As soon as the pressure in the control line has reached a lower limit value, preferably 0 bar, the timer is stopped 23.1. A vent time for the control connection/control line is then determined on the basis of the detected pressure and time measurement.

Figure 4:
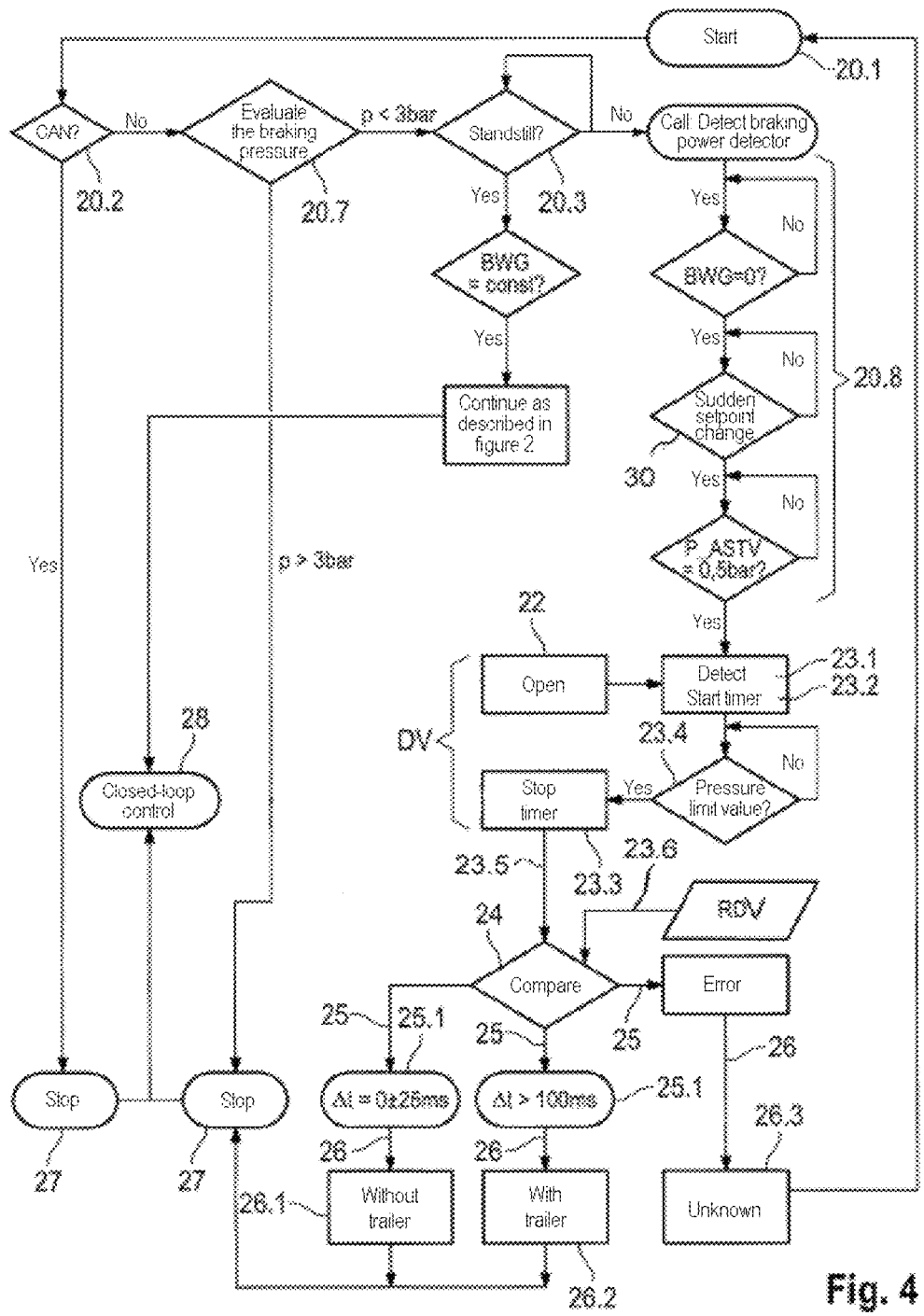
FIG. 4 shows a schematic flow diagram according to another possible embodiment of the method.

FIG. 4 shows a schematic flow diagram according to another possible embodiment of the method according to the invention after a driver braking by way of an actuation of a braking power detector by a driver. One possible time point for carrying out the detection method, in this case, is the vehicle being stopped at a traffic light, for example. Since the driver can release the braking power detector at any time, however, without there being indication thereof in advance, the vent time resulting from the detection method must not last longer than is typically expected by the driver.

As described above, an overall time period of approximately 1200 ms is required for the detection method, in particular for the ventilation and venting of the control connection, in order to enable the vehicle to subsequently move again. The duration of a standstill at a traffic light is sufficient for this, in principle, although the detection method must be aborted after the release of the braking power detector by the driver.

Another possibility, therefore, is to evaluate the vent time after a braking without the vehicle having come to an actual standstill. The setpoint pressure calculated by the brake management system depends on the actuation of the braking power detector. When the actuation of the braking power detector by the driver is diminished, then, starting at a certain time point, there is no longer a dependence on the braking pressure. As a result, below a certain braking pressure of 0.5 bar, braking pressure is no longer generated and the pressure drops (directly) to 0 bar, which therefore corresponds to a (small) sudden setpoint change 30 of 0.5 bar. In principle, a vent time can also be detected for this sudden setpoint change 30 and can be compared with a reference vent time. Due to the low level of the sudden setpoint change 30, however, the values for the vent time have a very high scattering. The high scatter can be compensated for, however, by a plurality of measurements. It is therefore advantageous to automatically carry out a large number of small measurements or sudden setpoint changes 30 during the running operation of the vehicle and to average the detected vent times. The sequence of the detection method, in this case, is similar to that of the method described above in FIG. 2.

First, the detection method depicted in FIG. 4 is started by an actuation of the braking power detector by a driver. As a result (cf. also FIG. 2), a check is first carried out to determine whether a detection of the trailer can be carried out 20.2 by use of a CAN signal. If a CAN signal is available, it is used and the detection method is terminated 27 and/or is switched further into the closed-loop control 28 of the brake system. If a CAN signal is not available, the detection method is continued, wherein, first, the braking pressure or the actuation of the braking power detector is evaluated 20.7. If a high braking pressure (p>3 bar) is measured, the detection method is aborted/stopped 27, since this is (possibly) an unexpected obstacle or a dangerous situation. In this case, the stability control functions must not be adversely affected and they have priority over the detection method. If the detected braking pressure is low (p<3 bar) or if the deceleration is a "moderate" braking of the vehicle, the detection method is continued.

Two variants are possible in this case. One is a detection, which is carried out at a standstill, for which a check is initially carried out to determine whether the vehicle actually comes to a standstill 20.3. The other possibility is an actuation of the braking power detector and, subsequently, a release of the braking power detector without the vehicle coming to a standstill (see above, small sudden setpoint change of 0.5 bar). Provided the vehicle speed is not 0 km/h, the detection method or a corresponding check routine waits to determine whether the driver brings the vehicle to a standstill or whether only the speed is reduced and the braking power detector is subsequently released again before the vehicle comes to a stop.

If the vehicle comes to a standstill, a detection method as depicted in FIG. 2 is carried out, wherein, starting at the time point of the standstill, a check is continuously carried out to determine whether the driver continues to actuate the braking power detector. Provided this is the case, a sudden setpoint change 30 (as described above) can be carried out. With the aid of the sudden setpoint change 30, a vent time is then detected via the timer and is subsequently evaluated (cf. FIG. 2 and corresponding description of FIG. 2, above).

For the case in which the speed of the vehicle is merely reduced (without coming to a standstill), the actuation of the braking power detector BWG must be monitored until it is released 20.8. The release of the foot of the driver from the braking power detector BWG results in a sudden setpoint change 30 of 0.5 bar. When the timer is started, a waiting period ensues, however, until the (actual) pressure in the control connection has reached a pressure value of 0.5 bar, in order to ensure comparability. The further method steps, in turn, are identical/similar to the method depicted in FIG. 2, wherein the difference values in the case of a small sudden setpoint change are different, in particular lower, of course. If the difference value of the detected vent time 23.5 and the reference vent time 23.6, wherein the reference vent time 23.6 represents a vent time without a trailer, is greater than Δt=+100 ms, a decision is made by the detection method in favor of an operating state of the vehicle with a trailer 26.2. However, if the difference is 0 or is in a range of Δt=+/−25 ms, a decision is made in favor of a solo mode 26.2 of the vehicle, i.e., without a trailer 26.2. If the evaluation result cannot be assigned to either the state with or without a trailer 26.1, 26.2, a decision is made 26.3 in favor of an unknown state, wherein the detection method is then repeated at the evaluation result can be assigned to one of the states, specifically with or without a trailer 26.1, 26.2.

Figure 5:
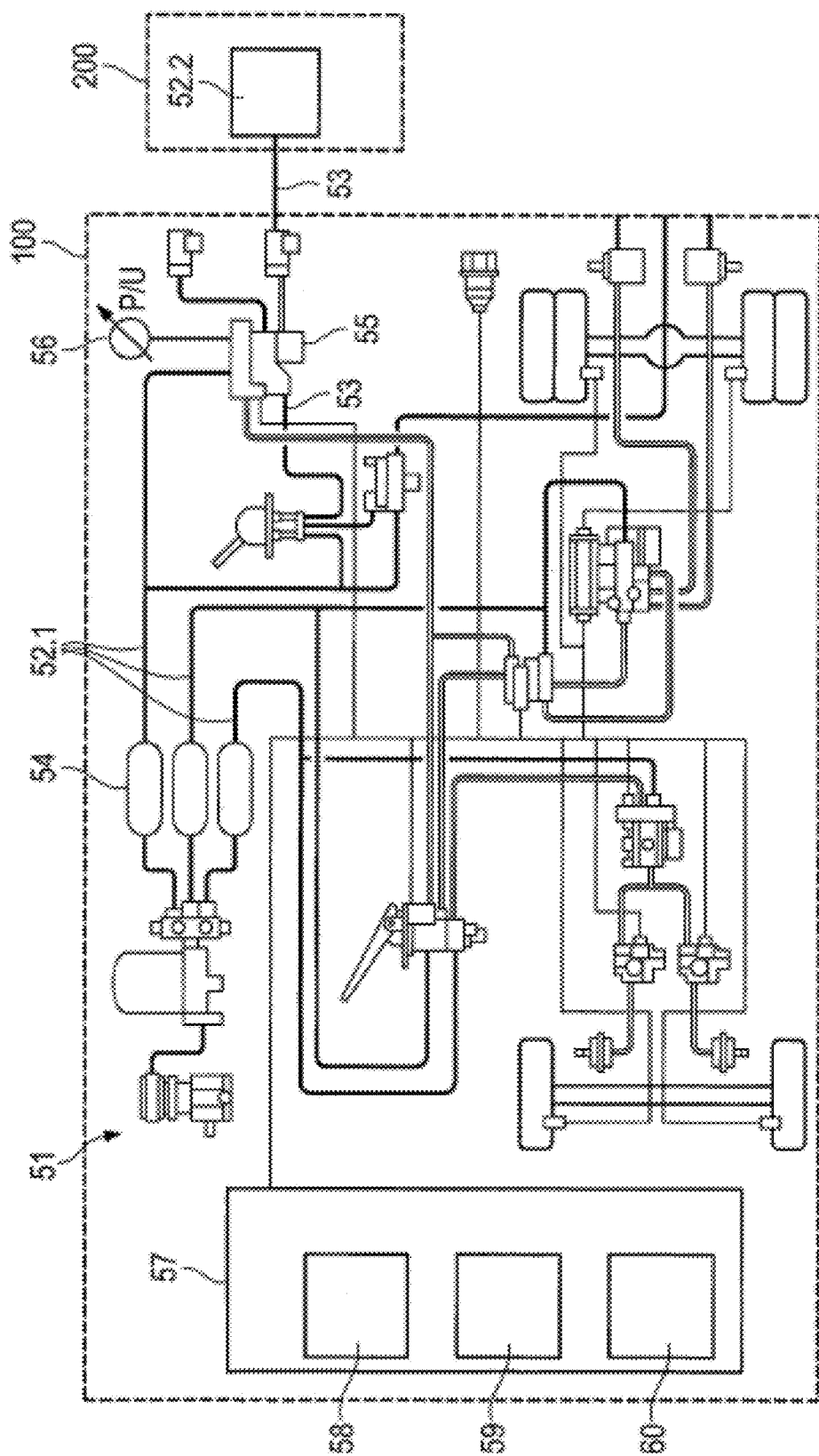
FIG. 5 shows a schematic depiction of one possible embodiment of the electro-pneumatic system of a vehicle.

FIG. 5 shows a schematic depiction of one possible embodiment of an electro-pneumatic system according to the invention, in particular a brake system for braking a vehicle 100. FIG. 5 shows a simplified depiction of an electro-pneumatic or pneumatic system for detecting an operating state of the vehicle 100, which is designed, in particular, for carrying out the different embodiments of the detection method. One embodiment of the invention comprises a pneumatic braking-pressure system 52.1 having a control connection 53, wherein the control connection 53 is designed for connecting the pneumatic braking-pressure system 52.1 to a further pneumatic braking-pressure system 52.2 of a trailer 200 (depicted merely schematically). Pressure, preferably up to a starting pressure of 6 bar, is applied to the control connection via a pressure accumulator 54 such that a sudden setpoint change can be carried out. A vent valve 55 for opening the control connection 53 to the environment is also provided at the control connection 53. After the control connection is opened to the environment, a pressure between the environment and the opened control connection is equalized after a certain time, wherein the temporal change in the pressure is detected by a pressure sensor 56, for example, in the form of a pressure-voltage sensor. In addition, a control unit 57 is provided, which determines an evaluation result from the detected temporal pressure pattern and a reference pressure pattern or from the corresponding vent times. Next, the evaluation result is assigned to an operating state of the vehicle 100, in particular to an operating state of the vehicle 100 with or without a trailer 200. In this case, the control unit 57 comprises, in particular, an evaluation module 58, a time-measuring instrument 59, and a comparison module 60. In one possible embodiment, the evaluation module 58, the time-measuring instrument 59, and the comparison module 60 are designed as software components of a brake management system.

Figure 6:
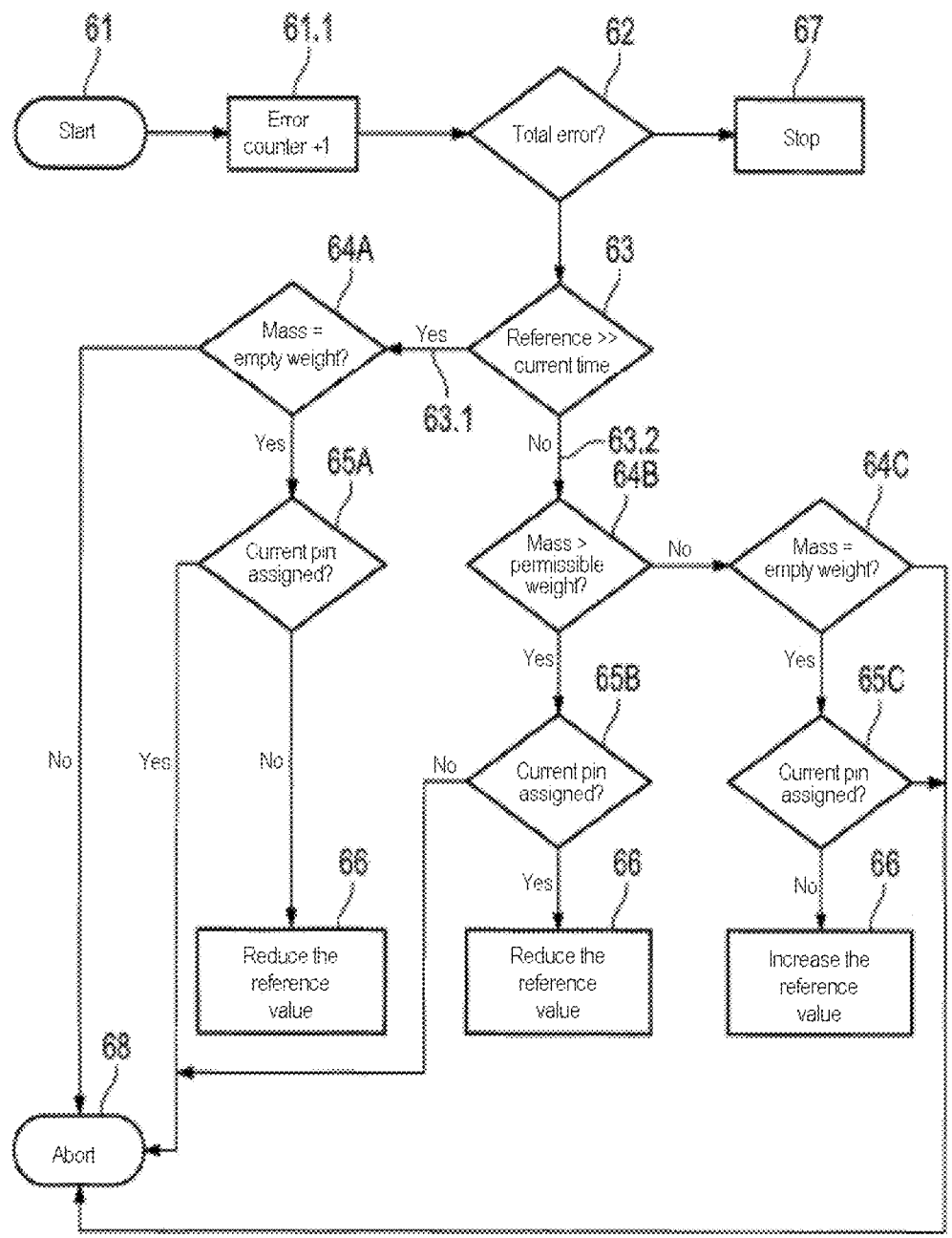
FIG. 6 shows a schematic flow diagram for an adjustment/correction of the reference value in one possible embodiment of the method.

FIG. 6 shows a schematic flow diagram for a correction/adjustment method for the reference value, in particular the reference vent time, according to one possible embodiment.

Experimental measurements of the vent times of the control connection of a vehicle have shown that these can be described by a linear function, provided a volume is constant (known), (see also formula 1.1, above). Deviations from this can exist in the case of unknown vehicles, however, in particular having unknown volumes, since the volume can be different. In this case, a correction of the reference function/the reference value can be necessary. One possible embodiment according to an adjustment/correction method is depicted in FIG. 6, wherein, in a simplified manner, only the reference value for the vent time is adjusted/corrected in such a way that said reference value is either reduced or increased.

Preferably, two error counters are provided for the adjustment/correction of the reference value. A first, temporary error counter (not shown), which is (re)set to zero every time the vehicle is started, and a second error counter. The first, temporary error counter is intended for detecting the consequences of errors that occur, e.g., due to incorrectly connected coupling heads. If a detection of the operating state according to the detection method is not possible, i.e., the operating state of the vehicle has been set to an unknown operating state/status, the first, temporary error counter is incremented by +1 after every run of the detection method (cf. also the description of FIGS. 2 and 4, above).

If a maximally permissible number of error measurements (error limit value) is reached with the first, temporary error counter, an adjustment of the reference value according to FIG. 6 becomes necessary.

In the adjustment method of the reference value shown in FIG. 6, after the error limit value has been reached, the method is initially called up or started 61 and the second error counter is incremented by +1, 61.1. The second error counter is not reset to zero after a shutoff of the vehicle, however. An error limit value, which must not be exceeded, is also provided for the second error counter. Therefore, the first step is to check 62 the current error limit value of the second error counter. At values below a specified limit value, the adjustment method for the reference value is continued. At values above a specified limit value, said adjustment method is terminated or stopped 67. In the latter case, an external diagnosis of the detection method, for example, in a workshop, is necessary.

The reference value can be corrected if the second error counter has not yet exceeded the limit value. To this end, first an evaluation of the deviation is necessary 63 to determine whether the reference vent time is too long 63.1 or too short 63.2. In the unknown operating state of the vehicle, two situations can occur, in principle, specifically, in one case, that the reference vent time is too long 63.1, i.e., a larger volume is assumed than is actually present in the vehicle, or, in another case, that the reference vent time is too short 63.2, which corresponds to a small volume.

In the present case, a difference is formed for the evaluation of the deviation. If the reference vent time is too long, the difference value of the measured vent time and the reference vent time is negative and less than $\Delta t = -50$ ms. This means that the installed line length in the vehicle, in particular, the volume to be vented, is smaller than was assumed. An adjustment is therefore carried out by reducing/shortening the reference vent time. Before the reference value is actually reduced, however, it must first be ensured or verified whether the determined vent time also actually belongs to the solo mode. For a verification of the solo mode, it is possible to query/utilize, for example, additional vehicle features, such as the mass of the vehicle and the pin assignment of a power supply, in particular a current pin. A trailer mode can always be ruled out in this case when the determined vehicle mass substantially corresponds to the empty weight of the vehicle. The adjustment method therefore initially checks 64A to determine whether the mass of the vehicle matches the empty weight of the vehicle. In addition, the power supply to the trailer is queried/checked 65A. The reference value is reduced only if both criteria indicate a solo mode and do not indicate a trailer mode. In this case, the reference value is reduced either with the aid of the formula 1.2 by adaptive adjustment and/or of an evaluation of an error memory. In the event of an error detection, preferably the "wrong" vent time is stored in the error memory. If the same error then occurs regularly, e.g., because the reference vent time is too short, the reference vent time can be corrected by forming an average with the stored "wrong" vent time.

If the detection method according to the invention, as described in FIG. 2 or 4, is subsequently carried out again and this results, in turn, in an error message or an unknown operating state of the vehicle, the correction method for the reference value can be repeated, wherein the second error counter is therefore incremented 61.1 by +1.

In the other situation, specifically the branch 63.2 in which the reference value for the vent time is too low, in particular if the difference value of the measured vent time and the reference vent time is in the range between the trailer mode and the solo mode, more precisely between $t=+50$ ms and $+200$ ms, the reference value is increased or decreased. In this case, either a trailer is present (branch 64B/65B) or a trailer is not present in branch 64C/65C. In the case in which a trailer is present (64B/65B), the reference value is reduced by the difference time above the critical value of greater than 200 ms. If a trailer is not present, the reference time is increased (branch 64C/65C) in order to move the difference time toward 0 ms.

Figure 7:
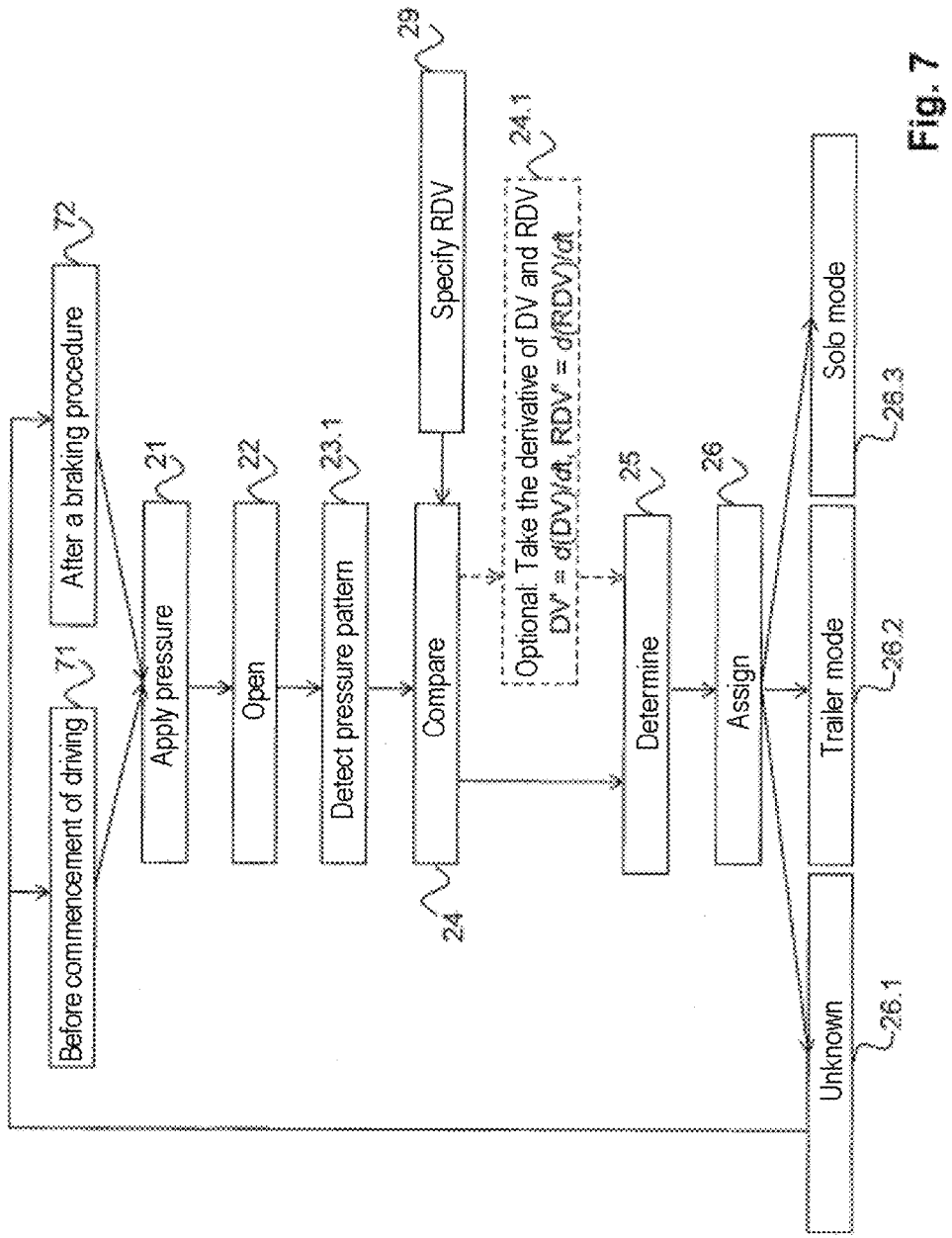
FIG. 7 shows a schematic flow diagram according to another possible embodiment of the method.

FIG. 7 shows a schematic flow diagram according to a further embodiment of the method for detecting an operating state of a vehicle. In this case, the vehicle can be assigned to a total of three operating states, in particular the state of the vehicle with a trailer 26.1, without a trailer 26.2, or to a third state, specifically an unknown state 26.3, if the current or determined state cannot be assigned to either the operating state with or without a trailer 26.1, 26.2.

The method depicted schematically in FIG. 7 can be carried out either before the commencement of driving 71 (cf., in this regard, the embodiment depicted in FIG. 2 and the associated description) and/or after a braking procedure 72 (cf., in this regard, the embodiment depicted in FIG. 4 and the associated description).

Next, pressure or compressed air, for example, from the compressed-air accumulator, is applied 21 to the control connection until a certain starting pressure has been reached in the control connection. After the certain starting pressure has been reached in the control connection, the control connection is opened 22 to the environment via a control valve such that a pressure between the control connection and the environment is equalized. During the pressure equalization, the temporal pressure pattern DV in the control connection is detected, in particular, the pressure behavior in the control line. In addition, a reference pressure pattern RDV is specified 29, to which the detected temporal pressure pattern DV is compared 24.

On the basis of the comparison 24 of the detected temporal pressure pattern DV with the reference pressure pattern RDV, an evaluation result is then determined 25, wherein the evaluation result is a measure, in particular, of a deviation of the detected pressure pattern from the reference pressure pattern. Alternatively or in addition, it can be provided that, in addition to the detection 23.1 of the temporal pressure pattern DV 23.1, a time derivative DV' (d(DV)/dt) of the temporal pressure pattern DV and a time derivative of the reference pressure pattern RDV' (d(RDV)/dt) are determined and are subsequently compared in order to determine an evaluation result. In this case, the evaluation result is a measure of a deviation between DV' (d(DV)/dt) and RDV' (d(RDV)/dt).

Finally, the evaluation result is assigned to the first, second, or third operating state of the vehicle, specifically the state of the vehicle with a trailer 26.1, without a trailer 26.2, or to the unknown state 26.3, wherein the method is repeated if an assignment to the unknown operating state 26.3 was carried out.

While the above description constitutes the preferred embodiments of the present invention, it will be appreciated that the invention is susceptible to modification, variation and change without departing from the proper scope and fair meaning of the accompanying claims.

What is claimed is:

1. A method for determining an operating state of a vehicle (100), wherein the operating state is selected from at least a first operating state (26.1) or a second operating state (26.2), and wherein the vehicle (100) includes a pneumatic brake system (52.1) and a pneumatic control connection (53) configured for connecting the pneumatic brake system (52.1) to a further pneumatic brake system (52.2) of a trailer (200), the method comprising the following steps:

applying (21) a pressure to the control connection (53) until a starting pressure (21.1) in the control connection (53) is set;
opening (22) the control connection (53) such that a pressure in the control connection (53) is equalized to a pressure of an environment;
detecting (23.1) a temporal pressure pattern (DV) during the pressure equalization;
comparing (24) the temporal pressure pattern (DV) to a reference pressure pattern (RDV);
determining (25) an evaluation result (25.1) based on the comparison (24) of the temporal pressure pattern (DV) and the reference pressure pattern (RDV); and
assigning (26) the evaluation result (25.1) to the first or the second operating state (26.1, 26.2) of the vehicle (100).

2. The method according to claim 1, wherein the opening (22) of the control connection (53) is carried out by means of a vent valve (55).

3. The method according to claim 1, wherein the temporal pressure pattern (DV) is a pressure drop (23.7) in the control connection (53).

4. The method according to claim 1, wherein, during the detection (23.1) of the temporal pressure pattern (DV), the following steps are additionally carried out:
starting (23.2) a time-measuring instrument (59) upon opening (22) the control connection (53);
stopping (23.3) the time-measuring instrument (59) when a pressure limit value (23.4) has been reached in the control connection (53); and
determining a vent time (23.5) of the control connection (53).

5. The method according to claim 4, wherein the vent time (23.5) of the control connection (53) is assigned to the temporal pressure pattern (DV) and a reference vent time (23.6) is assigned to the reference pressure pattern (RDV).

6. The method according to claim 5, wherein a difference is formed in the comparison (24) of the vent time (23.5) and the reference vent time (23.6).

7. The method according to claim 1, wherein, during the method, after the detection (23.1) of the temporal pressure pattern (DV), the method additionally includes the following steps:
determining a derivative with respect to time (DV') of the temporal pressure pattern (DV); and
comparing the derivative with respect to time (DV') of the temporal pressure pattern (DV) with a derivative with respect to time of the reference pressure pattern (RDV').

8. The method according to claim 1, wherein the starting pressure (21.1) in the control line (53) has a value of 6 to 5 bar.

9. The method according to claim 1, wherein the method is carried out in at least one of the following situations: before a commencement of driving (71) or after a braking procedure (72) of the vehicle (100).

10. The method according to claim 1, wherein the control connection (53) is at least partially emptied before the pressure is applied (21) to the control connection (53).

11. The method according to claim 1, wherein the opening (22) of the control connection (53) is not carried out until the pressure in the control connection (53) has reached a stable pressure level (23.8).

12. The method according to claim 1, wherein the evaluation result (25.1) is assigned to a third operating state (26.3) of the vehicle (100) if a current operating state cannot be assigned either to the first operating state (26.1) or the second operating state (26.2) of the vehicle (100).

13. The method according to claim 12, wherein, after the assignment (25) of the third operating state (26.3), the method is repeated until the evaluation result (25.1) is assigned to the first operating state (26.1) or the second operating state (26.2).

14. The method according to claim 1, wherein the first operating state (26.1) signifies a trailer attached to the vehicle and the second operating state (26.2) signifies that no trailer is attached to the vehicle.

15. An electro-pneumatic system (51) for determining an operating state (26.1, 26.2) of a vehicle (100) wherein the operating state (26.1, 26.2) is selected from at least a first and a second operating state of the vehicle (100), signifying the vehicle is with or without a trailer (200), respectively, comprising:
 a pneumatic braking-pressure system (52.1),
 a control connection (53), which is configured for connecting the pneumatic braking-pressure system (52.1) to a further pneumatic braking-pressure system (52.1) of the trailer (200),
 a pressure accumulator (54) for applying (21) a pressure to the control connection (53),
 a vent valve (55) for opening (22) the control connection (53) to an environment,
 a pressure sensor (56) for detecting (23.1) a temporal pressure pattern (DV) in the control connection (53),
 a control unit (57) configured for determining (25) an evaluation result (25.1) from the temporal pressure pattern (DV) and a reference pressure pattern (RDV) and assigning the evaluation result (25.1) to the operating state (26.1, 26.2) of the vehicle (100),
 wherein the operating state (26.1, 26.2) of the vehicle (100) is determined according to the following steps:
 applying (21) the pressure to the control connection (53) until a starting pressure (21.1) in the control connection (53) is set;
 opening (22) the control connection (53) such that a pressure in the control connection (53) is equalized to a pressure of the environment;
 detecting (23.1) the temporal pressure pattern (DV) during the pressure equalization;
 comparing (24) the temporal pressure pattern (DV) to the reference pressure pattern (RDV);
 determining (25) the evaluation result (25.1) based on the comparison (24) of the temporal pressure pattern (DV) and the reference pressure pattern (RDV); and
 assigning (26) the evaluation result (25.1) to the first or the second operating state (26.1, 26.2) of the vehicle (100).

16. A vehicle (100) containing an electro-pneumatic system (51) for detecting an operating state (26.1, 26.2, 26.3) of the vehicle (100), wherein the system (51) is configured for carrying out the method according to claim 1.

* * * * *